US011959703B2

(12) United States Patent
Robinson

(10) Patent No.: US 11,959,703 B2
(45) Date of Patent: Apr. 16, 2024

(54) MODULAR INDUSTRIAL ENERGY TRANSFER SYSTEM

(71) Applicant: WESTRAN THERMAL PROCESSING LLC, South Beloit, IL (US)

(72) Inventor: Zach Robinson, Janesville, WI (US)

(73) Assignee: WESTRAN THERMAL PROCESSING LLC, South Beloit, IL (US)

( * ) Notice: Subject to any disclaimer, the term of this patent is extended or adjusted under 35 U.S.C. 154(b) by 0 days.

(21) Appl. No.: 18/111,719

(22) Filed: Feb. 20, 2023

(65) Prior Publication Data

US 2023/0204289 A1 Jun. 29, 2023

Related U.S. Application Data

(62) Division of application No. 16/795,029, filed on Feb. 19, 2020, now Pat. No. 11,614,282.

(Continued)

(51) Int. Cl.

*F27B 17/00* (2006.01)

*F27D 11/00* (2006.01)

(Continued)

(52) U.S. Cl.

CPC .......... *F27B 17/0083* (2013.01); *F27D 11/00* (2013.01); *F27D 2007/045* (2013.01); *F27D 2019/005* (2013.01); *F27D 2019/0078* (2013.01)

(58) Field of Classification Search

CPC .................. F27B 17/0083; F27B 9/029; F27D 2007/045; F27D 11/00; F27D 7/04

(Continued)

(56) References Cited

U.S. PATENT DOCUMENTS 1,542,145 A 6/1925 Kauffman
2,688,685 A 9/1954 Goodell (Continued)

FOREIGN PATENT DOCUMENTS

CA 1086052 A 9/1980
CA 2114544 C 7/2003

(Continued)

OTHER PUBLICATIONS

International Application No. PCT/US2020/018775, International Search Report and Written Opinion, dated May 11, 2020.

(Continued)

*Primary Examiner* — Ko-Wei Lin

(74) *Attorney, Agent, or Firm* — MARSHALL, GERSTEIN & BORUN LLP

(57) ABSTRACT

A modular industrial energy transfer system includes a shell and at least one energy transfer unit coupled to the shell. The shell includes a plurality of sidewalls, a ceiling member coupled thereto, and a plurality of mounting structures disposed along the shell. The plurality of sidewalls and the ceiling member cooperate to define an interior volume to accommodate a work product. The at least one energy transfer unit is coupled to the shell via at least one of the plurality of mounting structures and is partially disposed through the shell to generate an airflow pattern through the interior volume of the shell.

8 Claims, 10 Drawing Sheets

Related U.S. Application Data

(60) Provisional application No. 62/704,059, filed on Feb. 20, 2019.

(51) Int. Cl.
*F27D 7/04* (2006.01)
*F27D 19/00* (2006.01)

(58) Field of Classification Search
USPC .......................................................... 432/247
See application file for complete search history.

(56) References Cited

U.S. PATENT DOCUMENTS

| | | | |
|---|---|---|---|
| 2,917,299 | A | 12/1959 | Hess |
| 3,353,805 | A | 11/1967 | Price |
| 3,476,368 | A | 11/1969 | Saiki |
| 3,988,900 | A | 11/1976 | Kamata et al. |
| 3,991,927 | A | 11/1976 | Napor et al. |
| 4,235,023 | A | 11/1980 | Best |
| 4,246,852 | A | 1/1981 | Werych |
| 4,300,882 | A | 11/1981 | Werych |
| 4,540,363 | A | 9/1985 | Ross et al. |
| 4,611,989 | A | 9/1986 | Kersting |
| 4,764,108 | A | 8/1988 | Carthew et al. |
| 4,892,030 | A | 1/1990 | Grieve |
| 4,972,606 | A | 11/1990 | Stoltz |
| 5,286,007 | A | 2/1994 | Takagi |
| 5,363,567 | A | 11/1994 | Best |
| 5,378,144 | A | 1/1995 | Cress |
| 5,588,830 | A | 12/1996 | Josefsson et al. |
| 5,906,485 | A | 5/1999 | Groff et al. |
| 5,923,699 | A | 7/1999 | Swanger |
| 6,074,206 | A | 6/2000 | Lauersdorf |
| 6,089,393 | A | 7/2000 | Revelli et al. |
| 6,295,823 | B1 | 10/2001 | Odom et al. |
| 6,905,332 | B1 | 6/2005 | Neal et al. |
| 7,216,464 | B2 | 5/2007 | Neal et al. |
| 7,264,467 | B1 | 9/2007 | Mitchell et al. |
| 9,239,191 | B2 | 1/2016 | Gibson |
| 9,291,394 | B2 | 3/2016 | Lesueur |
| 9,528,764 | B2 | 12/2016 | Woods et al. |
| 9,812,865 | B2 | 11/2017 | Treppmann et al. |
| 9,989,311 | B2 | 6/2018 | Korecki et al. |
| 10,689,722 | B2 | 6/2020 | Zheng et al. |
| 10,859,315 | B2 | 12/2020 | Mitchell |
| 2005/0133016 | A1 | 6/2005 | Neal et al. |
| 2007/0042313 | A1 | 2/2007 | Shibamura et al. |
| 2008/0076346 | A1 | 3/2008 | Ahmed |
| 2011/0120528 | A1 | 5/2011 | West et al. |
| 2012/0003597 | A1 | 1/2012 | Mason |
| 2013/0167396 | A1* | 7/2013 | Mitchell ................. F26B 25/06 34/223 |
| 2014/0196385 | A1 | 7/2014 | Demster |
| 2015/0041114 | A1 | 2/2015 | Del Toro et al. |
| 2015/0096974 | A1 | 4/2015 | Freeman et al. |
| 2018/0103804 | A1 | 4/2018 | Laub et al. |
| 2018/0128011 | A1* | 5/2018 | Preston ................... E04H 17/20 |

FOREIGN PATENT DOCUMENTS

| | | | |
|---|---|---|---|
| CN | 101501605 | A | 8/2009 |
| CN | 102771202 | A | 11/2012 |
| CN | 104379999 | A | 2/2015 |
| CN | 104798280 | A | 7/2015 |
| CN | 106086383 | A | 11/2016 |
| CN | 106415125 | A | 2/2017 |
| EP | 1788332 | A1 | 5/2007 |
| WO | WO-2008019038 | A1 | 2/2008 |
| WO | WO-2011053516 | A1 | 5/2011 |
| WO | WO-2013121789 | A2 | 8/2013 |
| WO | WO-2015191266 | A1 | 12/2015 |

OTHER PUBLICATIONS

International Application No. PCT/US2020/018775, International Preliminary Report on Patentability, dated Aug. 10, 2021.
European Patent Application No. 20758641.3, Extended European Search Report, dated Sep. 29, 2022.
Canadian Patent Application No. 3,128,235, Office Action, dated Sep. 22, 2023.

* cited by examiner

MODULAR INDUSTRIAL ENERGY TRANSFER SYSTEM

CROSS-REFERENCE TO RELATED APPLICATIONS

This application claims the benefit of U.S. patent application Ser. No. 16/759,290, entitled "Modular Industrial Energy Transfer System", filed Feb. 19, 2020 and U.S. Provisional Application No. 62/704,059, entitled "Modular Industrial Energy Transfer System", filed Feb. 20, 2019, the entirety of which is herein expressly incorporated by reference.

FIELD OF THE DISCLOSURE

The present disclosure generally relates to industrial heating units and, more particularly, to modular industrial heating units for thermally processing workloads.

BACKGROUND

Industrial and commercial heating units, commonly referred to as ovens and or furnaces, transfer energy in the form of heat to a workload in order to complete a thermal process. Example thermal processes can include curing and/or drying of components. These industrial heating units must add energy to the workload in a way that raises its temperature in a controlled, precise and repeatable manner. Energy may be transferred in a number, or combination, of approaches such as: forced convection, natural convection, radiant, microwave, and/or induction processes.

The practical implementation of any of these approaches varies by application and/or equipment manufacturer. Some example factors can include, but are not limited to: available installation space and/or dimensions of the manufacturer and/or user facility, over-the-road shipping constraints, preferred utility types, thermal process types and performance requirements, safety standards, budgetary concerns, preferred components, historic platforms previously implemented, manufacturing capabilities, and/or environmental constraints. Presently, manufacturers take end-user requirements for each unique project and build solutions that are optimized to each individual project. In essence, upon determining requirements of a particular project, manufacturers design an appropriate chassis, which is oftentimes a time-consuming, inefficient process due to the inability to rely on previous designs for guidance and/or standards. Manufacturers attempt to implement more cost-effective practices by optimizing each individual project, which results in configuring a system of off-the-shelf purchased components through a post-sale engineering process.

SUMMARY

In accordance with a first aspect, a modular industrial energy transfer system includes a shell and at least one energy transfer unit coupled to the shell. The shell includes a plurality of sidewalls, a ceiling member coupled thereto, and a plurality of mounting structures disposed along the shell. The plurality of sidewalls and the ceiling member cooperate to define an interior volume to accommodate a work product. The at least one energy transfer unit is coupled to the shell via at least one of the plurality of mounting structures and is partially disposed through the shell to generate an airflow pattern through the interior volume of the shell.

In some examples, the energy transfer unit or units may include a base member having a motor and at least one mounting leg coupled thereto, a housing member including a housing body having a drive opening, a housing inlet, and at least one housing mounting structure, a fan at least partially disposed within the housing, and a duct member operably coupled to the housing member. The at least one mounting leg of the base member is operably coupled to the at least one housing mounting structure. The fan is operably coupled to the motor via a motor drive shaft, which, in some examples, is inserted through the drive opening. The duct member includes a duct member includes a duct body having a duct inlet and at least one duct outlet. In these examples, actuation of the motor causes the fan to rotate which in turn causes air in the interior volume of the shell to enter the housing inlet and circulate through the at least one duct outlet.

In some aspects, the at least one mounting leg is inserted through at least one of the ceiling member or one of the plurality of sidewalls via at least one of the plurality of mounting structures. The duct member may be coupled to a sidewall via at least another one of the plurality of mounting structures.

In some forms, the energy transfer unit or units may be air recirculators. In some examples, the air recirculator may additionally include a heating element at least partially disposed within the housing member. The heating element may be, for example, at least one of an electric and/or a fluid heat source. Other examples are possible.

The modular industrial energy transfer system may include a controller operably coupled to the energy transfer unit or units to control operation thereof. In some approaches, the controller may control characteristics such as activation of the motor, an output of the motor, a fan speed, a heat output, and the like. Other examples are possible.

In accordance with a second aspect, a method of assembling a modular industrial energy transfer system includes providing a shell that includes a number of sidewalls, a ceiling member coupled to the number of sidewalls, and a number of mounting structures disposed along the shell. At least one desired characteristic of the modular energy transfer system is used to identify and select at least one energy transfer unit from a group of selectable energy transfer units. The modular industrial energy transfer system is assembled by mounting the at least one selected energy transfer unit to the shell via at least one of the mounting structures.

In accordance with a third aspect, a method of assembling a modular industrial energy transfer system includes providing a shell having a number of sidewalls, a ceiling member coupled to the number of sidewalls, and a number of mounting structures disposed along the shell. At least one energy transfer unit is coupled to the shell via at least one of the plurality of mounting structures such that the at least one energy transfer unit is partially disposed through the shell to generate an airflow pattern through the interior volume of the shell.

In accordance with a fourth aspect, a modular energy transfer unit is provided for use in a modular industrial energy transfer system that has a shell defining an interior volume. The modular energy transfer unit includes a base member including a motor and at least one mounting leg coupled to the motor, a housing member including a housing body having a drive opening, a housing inlet, and at least one housing mounting structure, a fan at least partially disposed within the housing member and being operably coupled to the motor via a motor drive shaft, and a duct member operably coupled to the housing member. The at least one mounting leg is operably coupled to the at least one housing mounting structure. The duct member includes a duct body having a duct inlet and at least one duct outlet. A portion of the at least one mounting leg is adapted to operably couple to the shell of the modular industrial energy transfer system to secure the modular energy transfer unit within the interior volume of the shell. Actuation of the motor causes the fan to rotate, thereby causing air in the interior volume of the shell to enter the housing inlet and circulate through the at least one duct outlet.

BRIEF DESCRIPTION OF THE DRAWINGS

The above needs are at least partially met through provision of the modular industrial energy transfer system described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
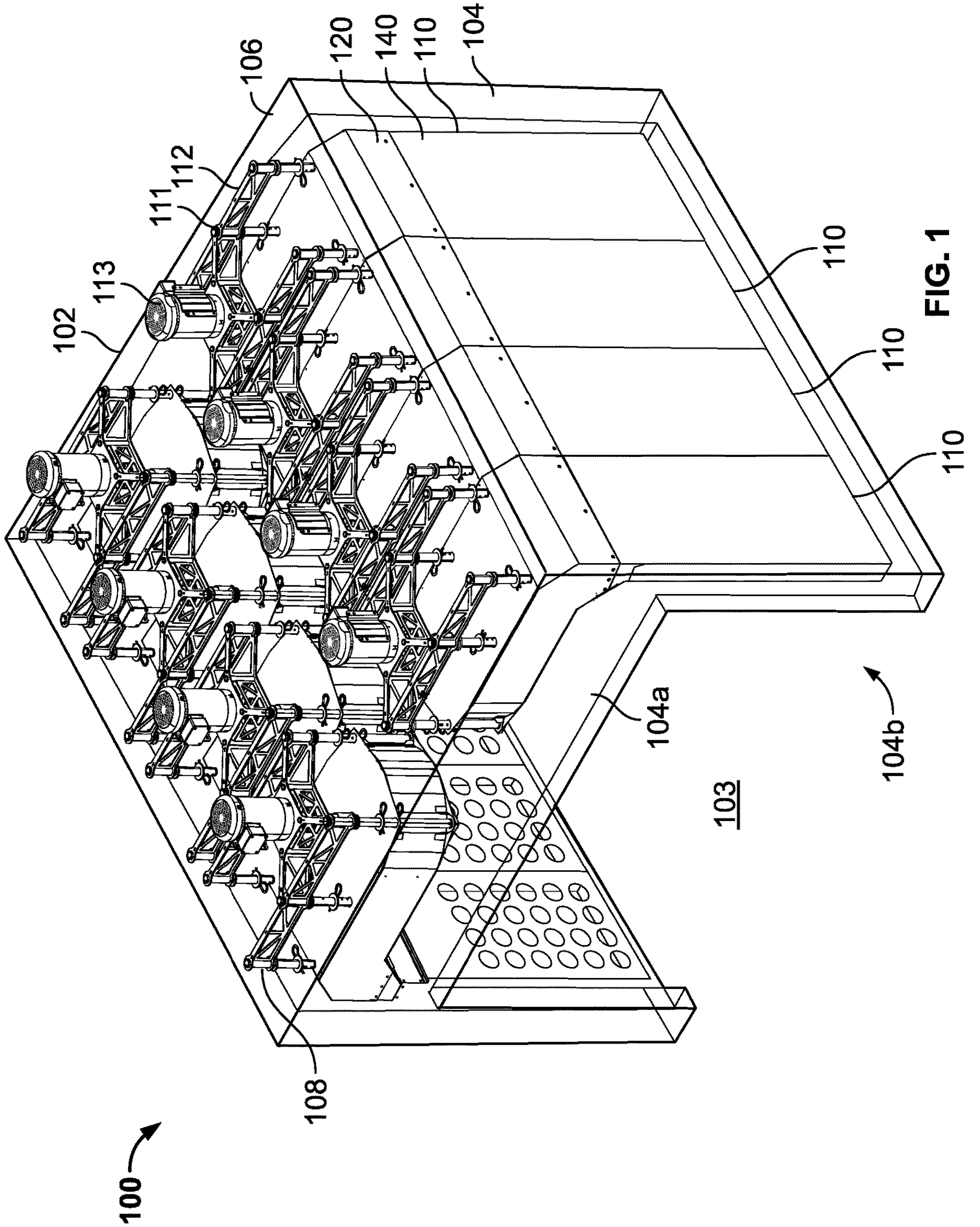
FIG. 1 illustrates a perspective view of an example modular industrial energy transfer system having a plurality of energy transfer units in accordance with various embodiments.
Figure 2:
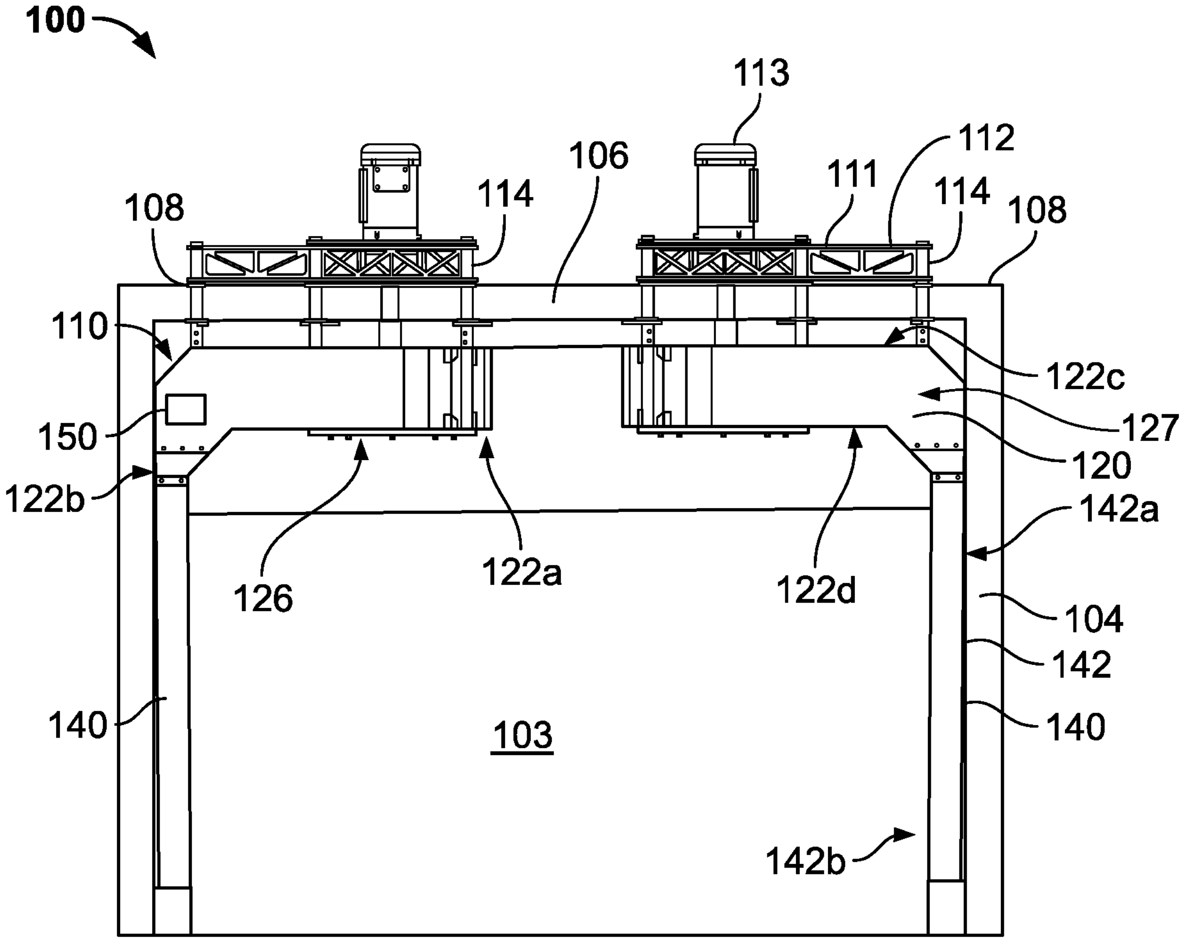
FIG. 2 illustrates a side elevation view of the example modular industrial energy transfer system of FIG. 1 in accordance with various embodiments.
Figure 3:
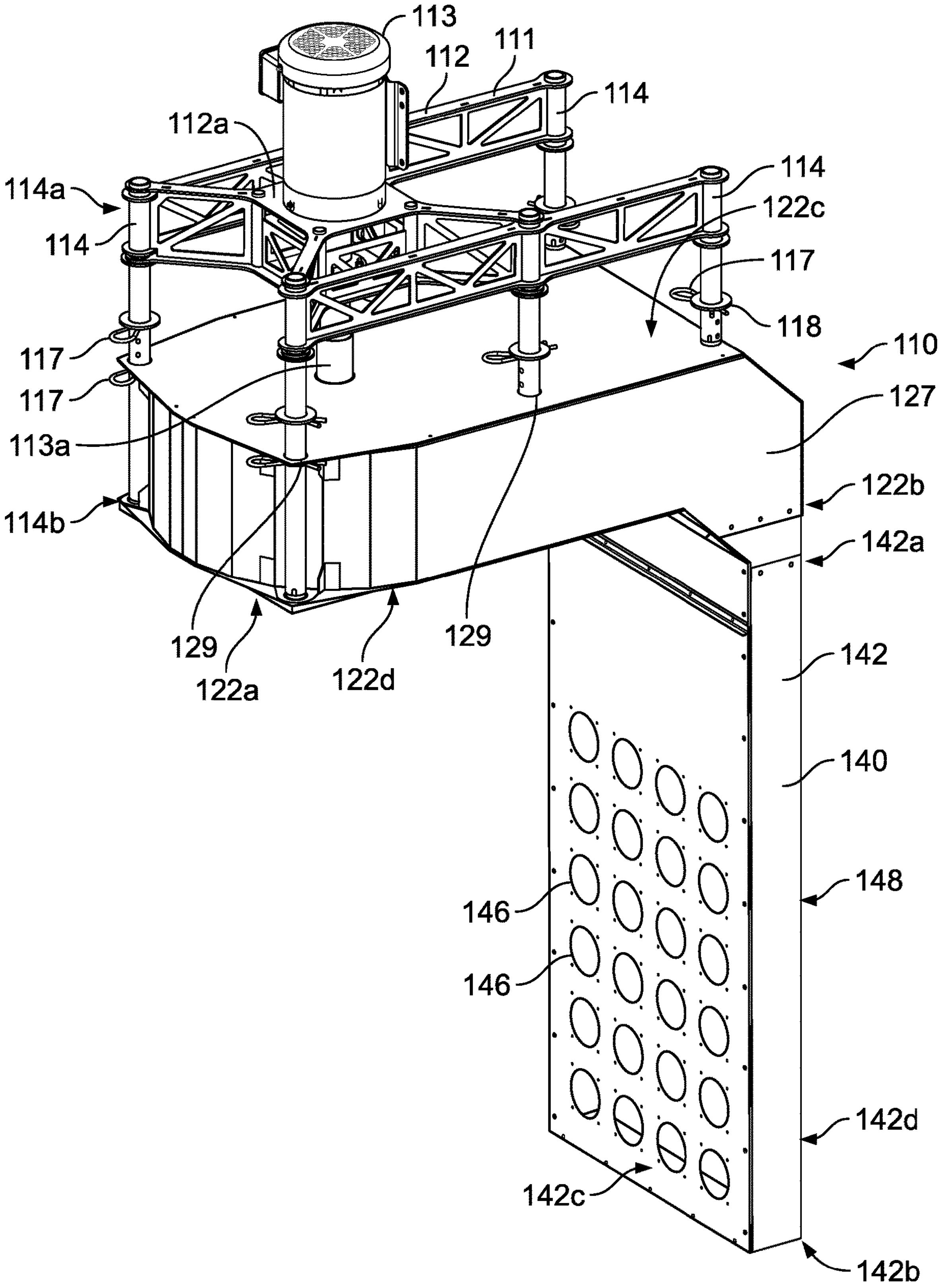
FIG. 3 illustrates a perspective view of an example energy transfer unit of the example modular industrial energy transfer system of FIGS. 1 and 2 in accordance with various embodiments.

Turning to FIGS. 1 and 2, generally speaking, pursuant to these various embodiments, a modular industrial and/or commercial energy transfer system 100 (e.g., an oven or a furnace) includes a shell 102 that accommodates any number (e.g., one or more) of modular energy transfer units 110 that couple to the shell 102 and that combine ductwork, a mass flow transfer device, and an optional heat source into an optimized product. The system 100 may be used in batch, conveyorized, and or automated energy transfer environments. The shell 102 includes any number of sidewalls 104 and a ceiling member 106 coupled to the sidewalls 104. In some forms, the shell 102 may include a floor or platform member that is raised or elevated above ground level.

The shell 102 defines an interior volume 103 to accommodate a working product to receive a transfer of energy. For example, the working product may receive a transfer of energy via a baking process, a drying process, a curing process, and the like. Other examples are possible. As noted, the interior volume 103 may additionally accommodate any number of sub-systems such as conveyance devices, work or assembly stations, and the like. Other examples are possible.

The sidewalls 104 and/or the ceiling member 106 may be constructed using any number of approaches. For example, the sidewalls 104 and/or the ceiling member 106 may be in the form of an insulated panel member or an arrangement of insulated panel members having a desired thickness (e.g., between approximately 4" and approximately 7"). In other approaches, the sidewalls 104 and/or the ceiling member 106 may be in the form of a can-constructed industrial oven shell. Other examples of suitable materials are possible, such as, for example, aluminum, ceramic, and the like. In the illustrated example of FIGS. 1 and 2, the shell 102 includes a first and second sidewall 104 and a partial wall **104*a* having an opening 104*b* to accommodate a door or entry point (not shown) to the interior volume 103 of the shell 102. In other examples, the shell 102 may be entirely enclosed or sealed. The shell 102 may be dimensioned to form an interior volume 103 required to accommodate the desired working product. As an example, the shell 102 may form an interior volume 103** of unlimited capacity.

The system 100 further includes any number of mounting structures 108 disposed along the shell. In some examples, the mounting structures 108 are in the form of mounting holes or openings dimensioned to receive securing components therein. In other examples (not illustrated), the mounting structures may be in the form of any number of brackets, ledges, flanges, and the like. Other examples are possible.

With reference to FIGS. 1-5, each energy transfer unit 110 is coupled to the shell 102 via the mounting structures 108. The energy transfer units 110 include a base member 111, a housing member 120, a fan 130, and a duct member 140. As will be discussed in further detail below, the energy transfer unit 110 may include any number of additional components to assist in the transfer of energy to the work product.

Figure 4:
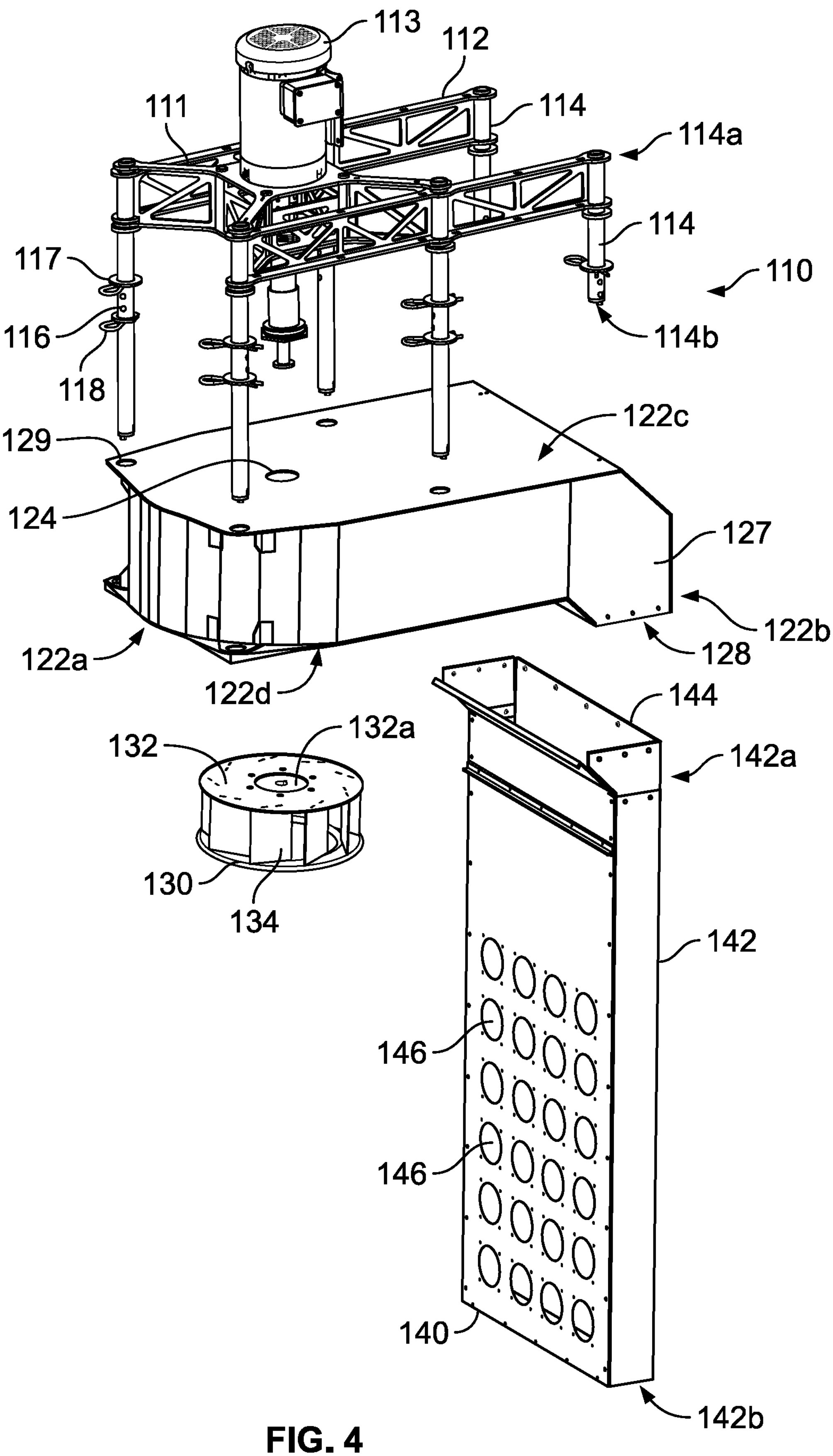
FIG. 4 illustrates an exploded perspective view of the example energy transfer unit of FIG. 3 in accordance with various embodiments.
Figure 5:
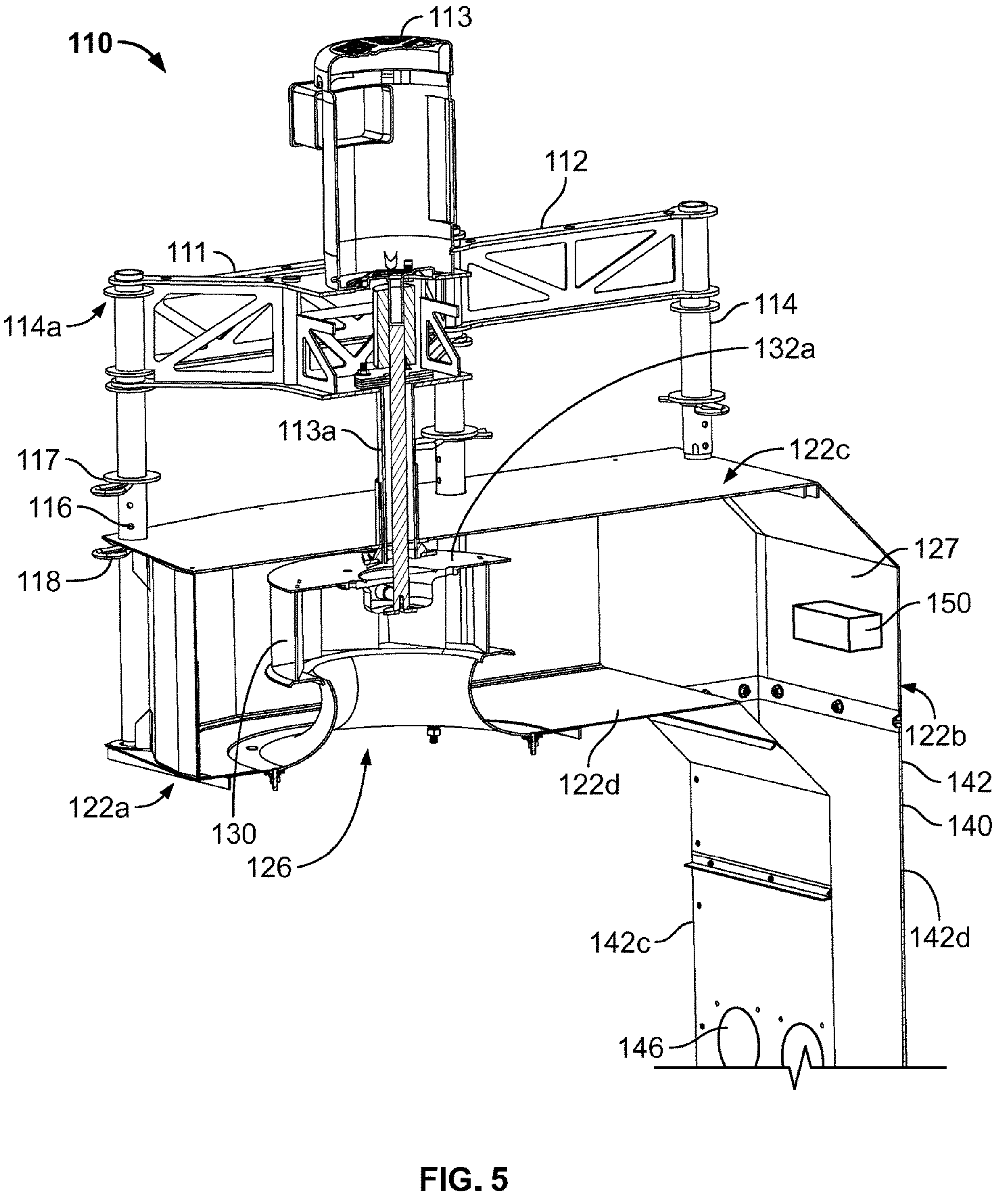
FIG. 5 illustrates a cross-sectional perspective view of the example energy transfer unit of FIGS. 3 and 4 in accordance with various embodiments.
Figure 6:
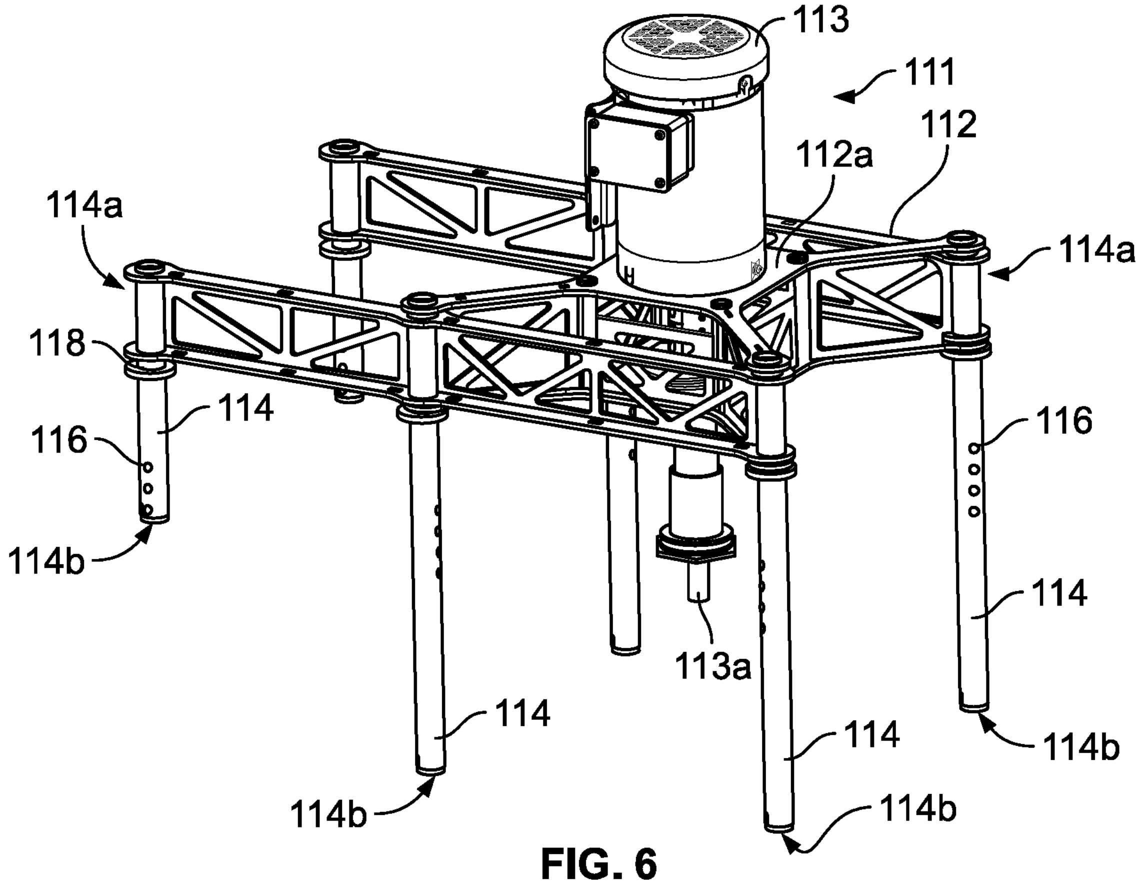
FIG. 6 illustrates a perspective view of an example base member of the example energy transfer unit of FIGS. 3-5 in accordance with various embodiments.

With continued reference to FIGS. 1-5, and additional reference to FIG. 6, the base member 111 includes a body or frame 112, a drive mechanism or motor 113 coupled to the frame 112, and any number of mounting legs 114 also coupled to the frame 112. The frame 112 may be in the form of a cross-bracing assembly and can be constructed from any number of suitable materials, such as metals and/or polymeric materials. In some examples, the mounting legs 114 may be formed integrally with the frame 112, and in other examples, the energy transfer unit 110 may not utilize a frame member thereby reducing an overall height of the unit.

The frame 112 may include a mounting portion 112*a* to which the motor 113 is coupled using any number of approaches. In the illustrated example, the mounting portion 112*a* defines an opening (not shown) to which a drive shaft 113*a* operably coupled to the motor 113 is inserted therethrough.

Each of the mounting legs 114 is in the form of an elongated bar or rod having a proximal end 114*a* coupled to and/or integrally formed with the frame 112 and a distal end 114*b*. as illustrated in FIG. 6, the mounting legs 114 include any number of holes 116 disposed along the longitudinal length thereof to receive a leg securement device 117, such as a cotter pin or other clamping device. The mounting legs 114 may also include any number of flanges or ledges 118 disposed thereon. The base member 111 may include any number of additional components such as, for example, rivets, bolts, welds, or other securing mechanisms.

Figure 7:
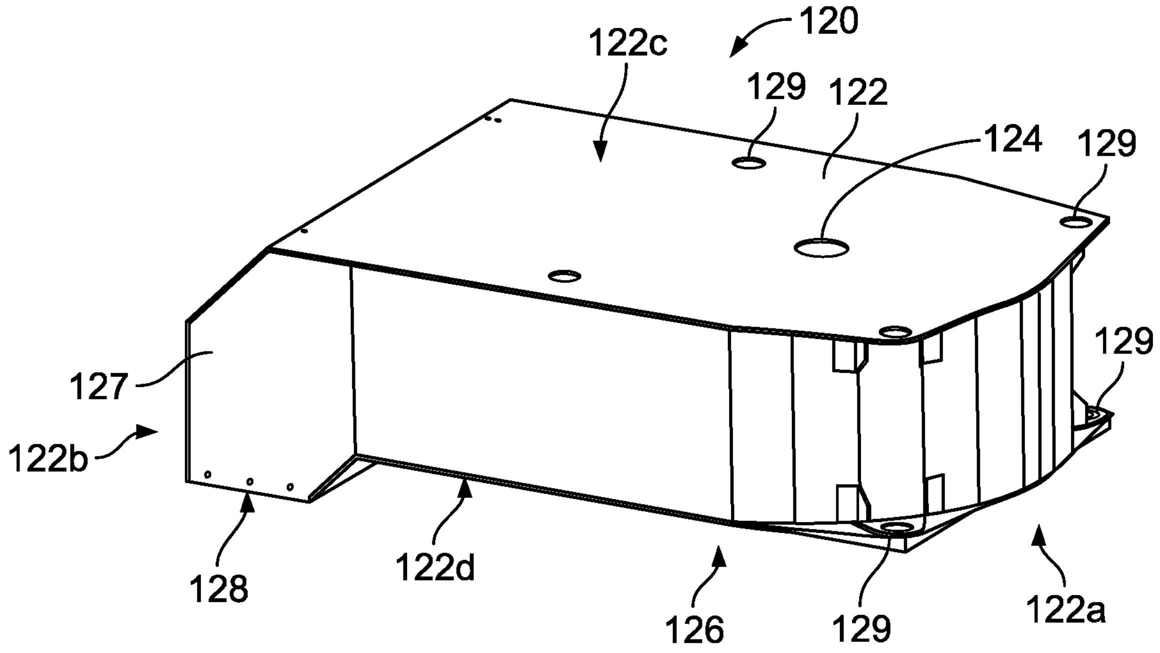
FIG. 7 illustrates a perspective view of an example housing member of the example energy transfer unit of FIGS. 3-5 in accordance with various embodiments.

With continued reference to FIGS. 1-5, and additional reference to FIG. 7, the housing member 120 is in the form of an upper ventilation unit that includes an elongated, generally hollow housing body 122 having a proximal end 122*a*, a distal end 122*b*, an upper sheet or layer 122*c*, and a lower sheet or layer 122*d*. The housing member 120 can be constructed from any number of suitable materials such as, for example, an expanded metal material. In the illustrated example, the upper layer 122*c* of the housing body 122 defines a drive opening 124, and the lower layer 122*d* of the housing body 122 defines a housing inlet 126 near the proximal end 122*a* thereof. Further, the distal end 122*d* of the housing body defines an elbow or bent region 127 and a housing outlet 128. While the illustrated examples depict the elbow 127 as being a number of angled segments, in other examples, the elbow 127 may be in the form of a curved member.

Positioned along the housing body 122 are any number of coupling mechanisms 129 which, in the illustrated example, are in the form of holes to accept the mounting legs 114 as will be discussed in further detail below. The housing body 122 may include any number of additional components such as, for example, rivets, bolts, welds, or other securing mechanisms.

With continued reference to FIGS. 4 and 5, the fan 130 may include a fan body 132 that defines a coupling portion 132*a* and may further include any number of vanes 134 arrange about the fan body 132. In the illustrated example, the coupling portion 132*a* is an opening adapted to receive a portion of the drive shaft 113*a*.

Figure 8:
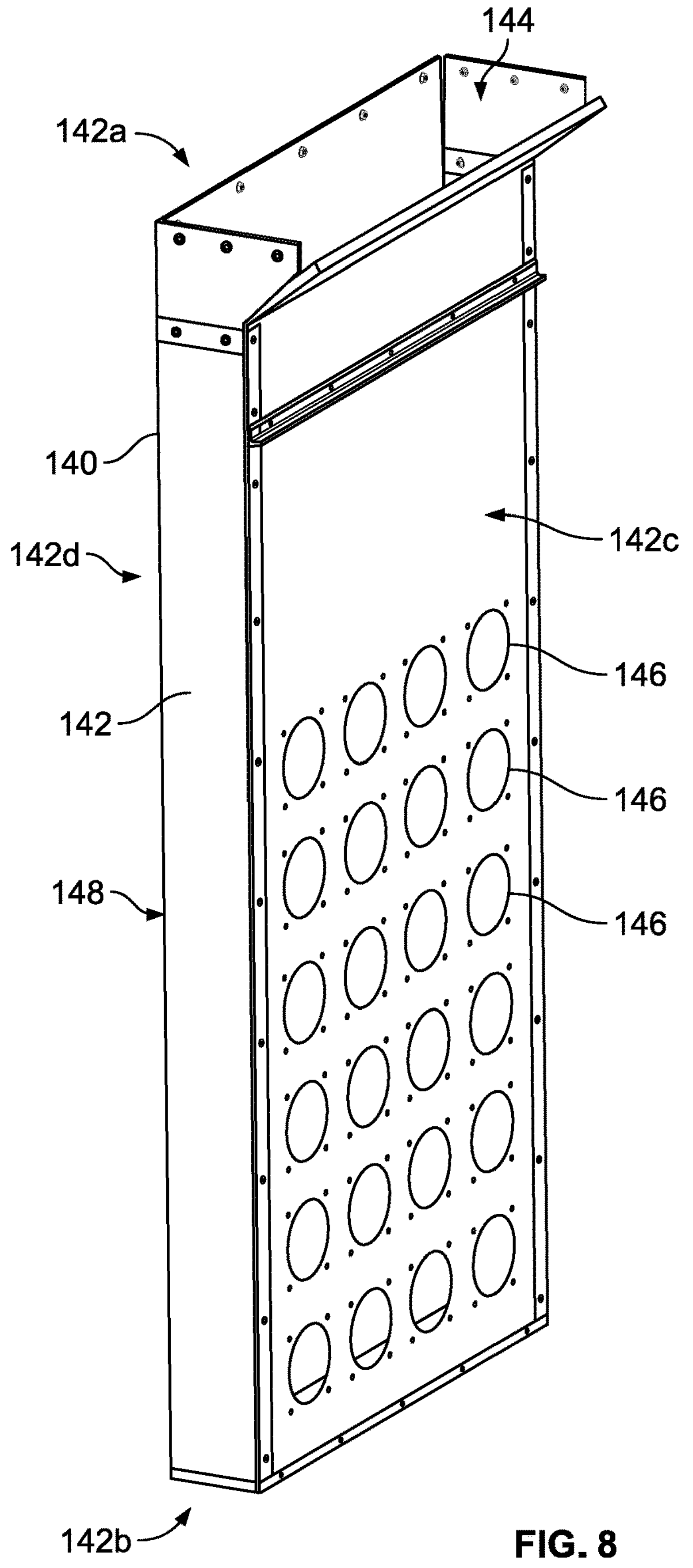
FIG. 8 illustrates a perspective view of an example duct member of the example energy transfer unit of FIGS. 3-5 in accordance with various embodiments.

With continued reference to FIGS. 1-5, and additional reference to FIG. 8, the duct member 140 is in the form of a lower ventilation unit that includes an elongated, generally hollow duct body 142 having a proximal end 142*a*, a distal end 142*b*, an inner sheet or layer 142*c*, and an outer sheet or layer 142*d*. The duct member 140 can be constructed from any number of suitable materials such as, for example, an expanded metal material. In the illustrated example, the proximal end 142*a* of the duct body 142 defines a duct inlet 144 that abuts and/or is coupled to the housing outlet 128. The distal end 142*b* of the duct body 142 is sealed or closed off. Further, the inner layer 142*c* of the duct body 142 defines any number of duct outlets 146, and the outer layer 142*d* of the duct body 142 may define a coupling portion 148 (e.g., in the form of holes, flanges, and/or bolts) to secure and/or align the duct body 142 to the sidewall 104 if desired. The duct body 142 may include any number of additional components such as, for example, rivets, bolts, welds, or other securing mechanisms.

Figure 9:
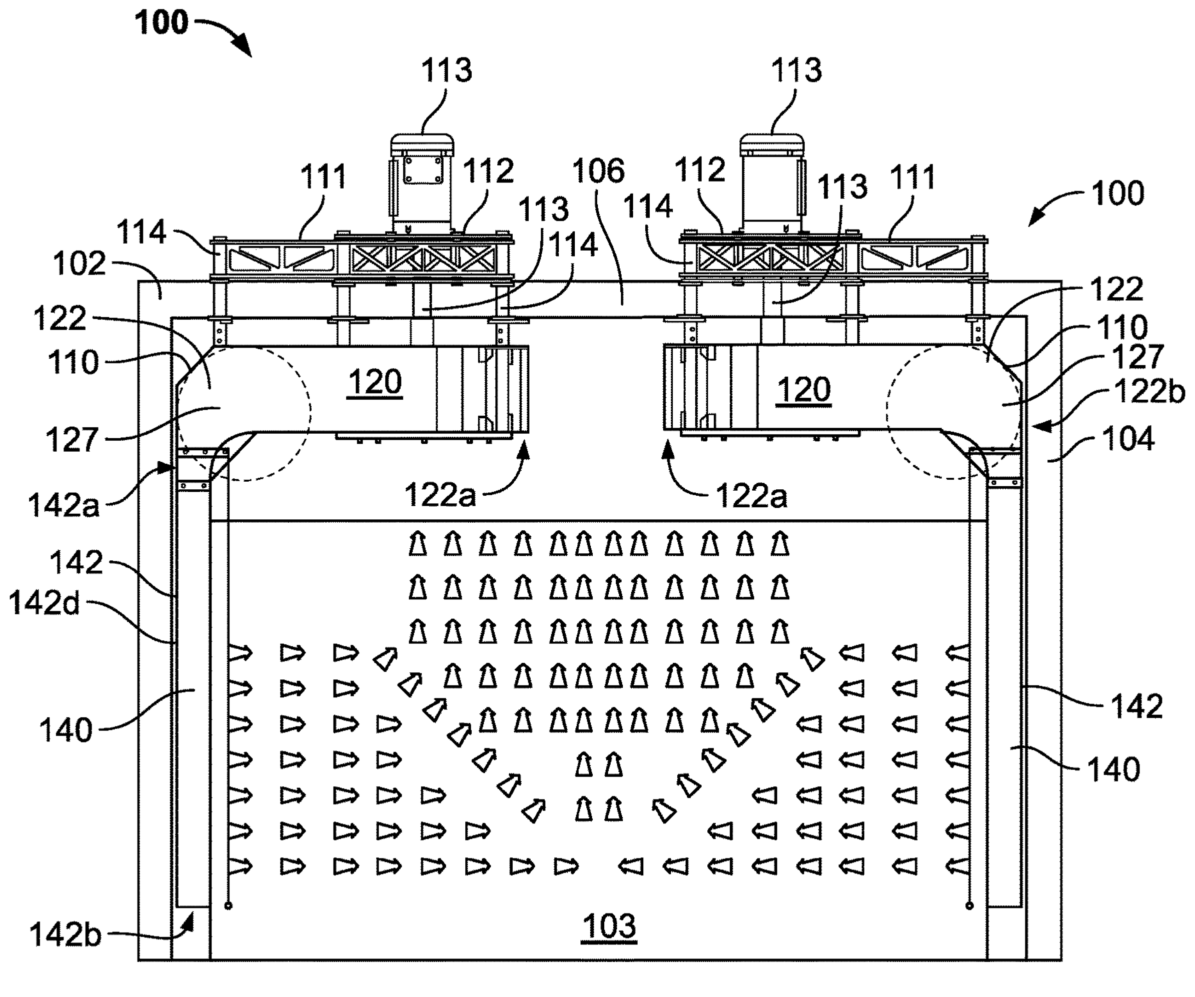
FIG. 9 illustrates a side elevation view of the example modular industrial energy transfer system of FIGS. 1-8 illustrating an example airflow pattern in accordance with various embodiments.

In some examples, to install the energy transfer system 100, a pattern of mounting structures 108 (e.g., holes) may be formed along the shell 102, such as, for example, through the ceiling member 106. In some examples, the shell 102 may come pre-formed with any number of patterns of mounting structures 108. The distal ends 114*b* of the mounting legs 114 are then aligned with the mounting structures 108 and inserted therethrough. As a result, and as illustrated in FIGS. 2 and 9, a portion of the frame 112 and/or the motor 113 may be disposed above and at least partially supported by the ceiling member 106. In some examples, the flanges or ledges 118 may be positioned along the mounting legs 114 such that the ledges 118 rest on top of the ceiling member 106. Other examples are possible. Additionally, in some approaches, the leg securement device 117 may be inserted into a desired hole 116 positioned below the ceiling member 106 to limit and/or restrict the base member 111 from upwardly displacing relative to the ceiling member 106.

The fan body 132 is then aligned with the housing inlet 126 of the housing member 120 and installed into the interior volume of the housing body 122. Next, the distal ends 114*b* of the mounting legs 114 are aligned with the coupling mechanisms 129 of the housing member 120, and the drive shaft 113*a* is aligned with the coupling portion 132*a* of the fan body 132. The drive shaft 113*a* may be secured to the fan body 132 via a press-fit connection or any suitable other approach using desired components. Upon inserting the mounting legs 114 through the coupling mechanisms 129 of the housing member 120, the leg securement devices 117 may be inserted into the holes 116, which may be positioned above and/or below the upper and lower layers 122*c*, 122*d* of the housing body 122, thereby securing the base member 111 to the housing member 120. As a result, the base member 111, the housing member 120, and the fan 130 are all operably coupled to the ceiling member 106.

The distal end 122*b* of the housing body 122 may be coupled to the proximal end 142*a* of the duct body 142 via any number of suitable approaches such as, for example, rivets, screws, bolts, and the like. Further, the duct member 140 may be secured to the sidewalls 104 via mounting structures 108, if desired. In some examples, the duct member 140 needn't be secured to the sidewalls 104 in order for the energy transfer unit 110 to function properly within the interior volume 103 of the shell 102.

As a result, the energy transfer unit 110 is coupled to the shell 102. The housing member 120, combined with the duct member 140, form a recirculating unit that causes air to flow recirculate through the interior volume 103 of the shell 102. As illustrated in FIG. 9, which depicts a number of energy transfer units 110 disposed on opposing sidewalls 104, upon activation of the motor 113, the drive shaft 113*a* causes the fan body 132, and thus the vanes 130 to rotate to draw in air through the housing inlet 126. The air then flows to the distal end 122*b* of the housing body 122, through the elbow 127, out of the housing outlet 128, and into the duct inlet 144. The air then travels towards the distal end 142*b* of the duct body 142, and exits the duct body 142 via duct outlets 146, thereby reentering the interior volume of the shell 103. As a result, air flow having desired uniformity characteristics may be achieved by positioning any number of energy transfer units 110 about the perimeter of the shell 102.

In some examples, depending on particular end-user requirements, energy transfer units 110 having additional functionality may be used. For example, in some environments, an end-user may wish to incorporate a heating element into the energy transfer system 100. Accordingly, each energy transfer unit 110 may accommodate a heater 150 (FIGS. 2 & 5) disposed in the elbow 127 of the housing body 122. In some examples, the heater 150 may be positioned at any location relative to the energy transfer unit 110 (e.g., at or near any surface and/or component near the proximal end 122*a*, the distal end 122*b*, the upper layer 122*c*, the lower layer 122*d*, etc.). Selective positioning of the heater 150 may advantageously provide for improved and/or uniform heat transfer to the desired object.

The heater 150 may take any number of forms, and may be electrically and/or fluidly (e.g., natural and/or propane gas, steam, oil, and/or water) powered. Other examples suitable heat sources are possible. By positioning the heater 150 in the elbow, heated air will exit the duct outlets 146 to transfer thermal energy to the desired working product. The fan 130 will draw cooled air back into the energy transfer unit 110 to again be heated by the heater 150. Other examples of additional energy transfer unit 110 functionality may include any number of the following: control modules, remote access modules, expansion modules, limit modules, scanner modules, fixed speed motor modules, variable speed motor modules, flame safety modules, electric power modules, electric safety chain modules, gas safety chain modules, fuel train modules, onboard diagnostics modules, data acquisition modules, and the like.

In some approaches, to ascertain an appropriate energy transfer system 100, at least one desired characteristic of the system 100 is used to identify a particular energy transfer unit 110 from an available selection of energy transfer units 110. This desired characteristic may include a desired energy transfer (e.g., a heat transfer) capacity, a desired energy transfer source, and the like. Other examples are possible.

As previously noted, a controller may be used to control any number of energy transfer units 110 installed in the shell 102. The controller may function to control multiple energy transfer units 110 in a similar manner, or alternatively may control each energy transfer unit 110 differently. As a result, in some examples, different regions of the interior volume 103 may selectively have different air flow characteristics, different temperatures, and the like.

In some aspects, each energy transfer unit 110 may interact with multiple computing systems and/or controllers. For example, the energy transfer units 110 may interact with a system common remote human interface module or a system common facility interface module. These modules may act as a common hub from which each energy transfer unit 110 receives power and instructions and delivers data and status. In addition, other system wide non-energy transfer unit 110 hardware (e.g., exhausters, conveyance apparatuses, etc.) may also interface through these modules.

Advantageously, by prioritizing modularity over cost concerns, and utilizing first-order principles to determine a lowest cost of vendor margins, manufacturing and application inefficiencies are greatly reduced and/or removed. Specifically, by requiring multiple functional requirements in common components, eliminating unnecessary interfaces (e.g., wires), and/or eliminating the need for varying energy transfer units, engineering costs will be lowered. Further, scaled manufacturing approaches can result in an increase in overall system quality, and lead times for delivering the system to end users is reduced.

Additionally, because the energy transfer units 110 may be mounted using, in some examples, a simple mounting template, the described system can be used in any number of manufacturer ovens, including previously-existing ovens installed at user locations. Further, while the energy transfer units 110 described herein are described as being partially disposed through the ceiling member 106, in some arrangements, in some examples, the energy transfer units 110 may be partially disposed through any number of sidewalls 104. Accordingly, the engineering time required to design the shell 102 is substantially reduced, as the energy transfer units 110 may be used to retrofit existing spaces. Further, development of shell 102 technologies may be decoupled from the development of the energy transfer unit 110 system, and can easily and rapidly be expanded in existing ovens.

Figure 10:
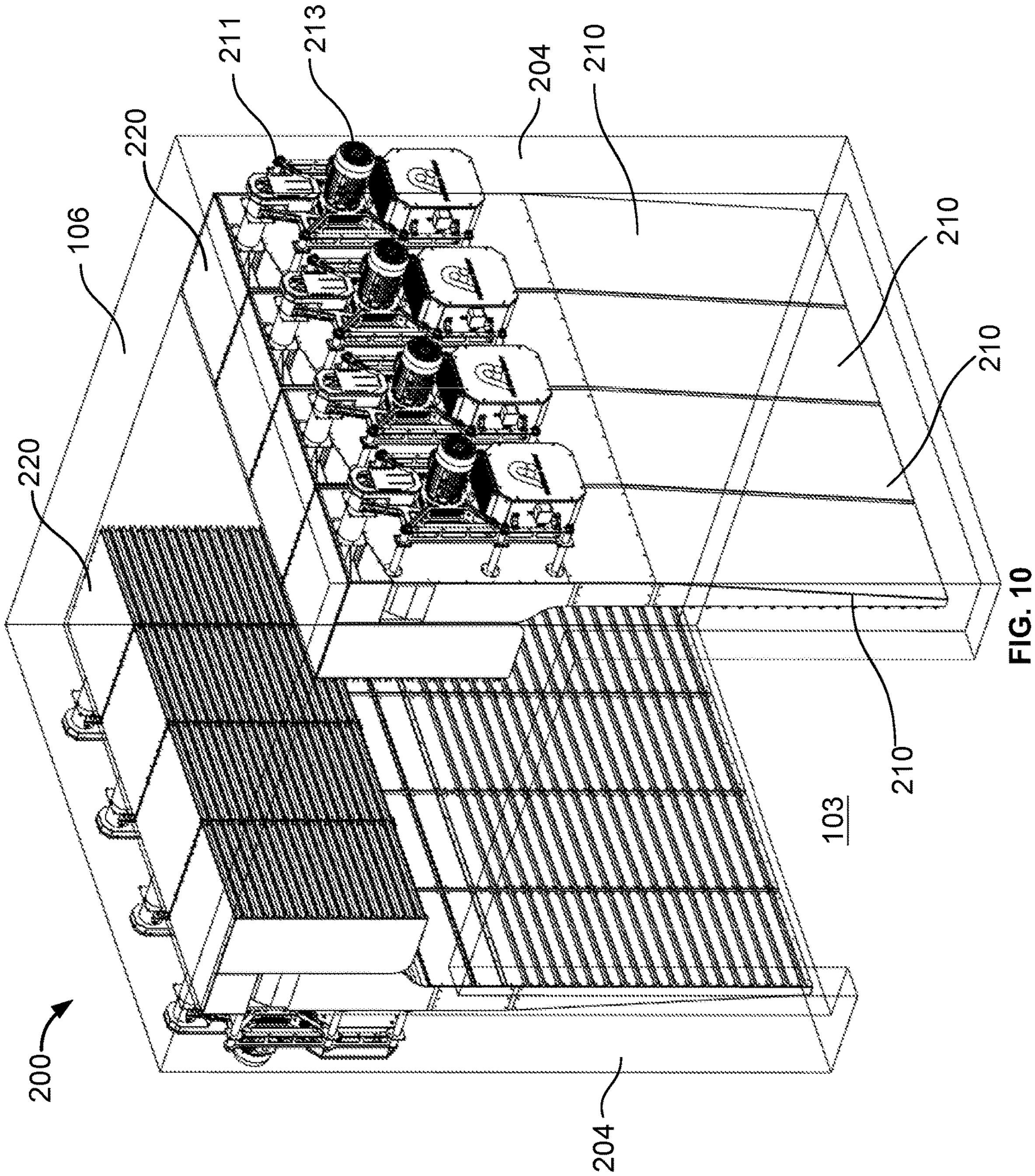
FIG. 10 illustrates a perspective view of an alternative example modular industrial energy transfer system having a side-mounting arrangement in accordance with various embodiments.
Figure 11:
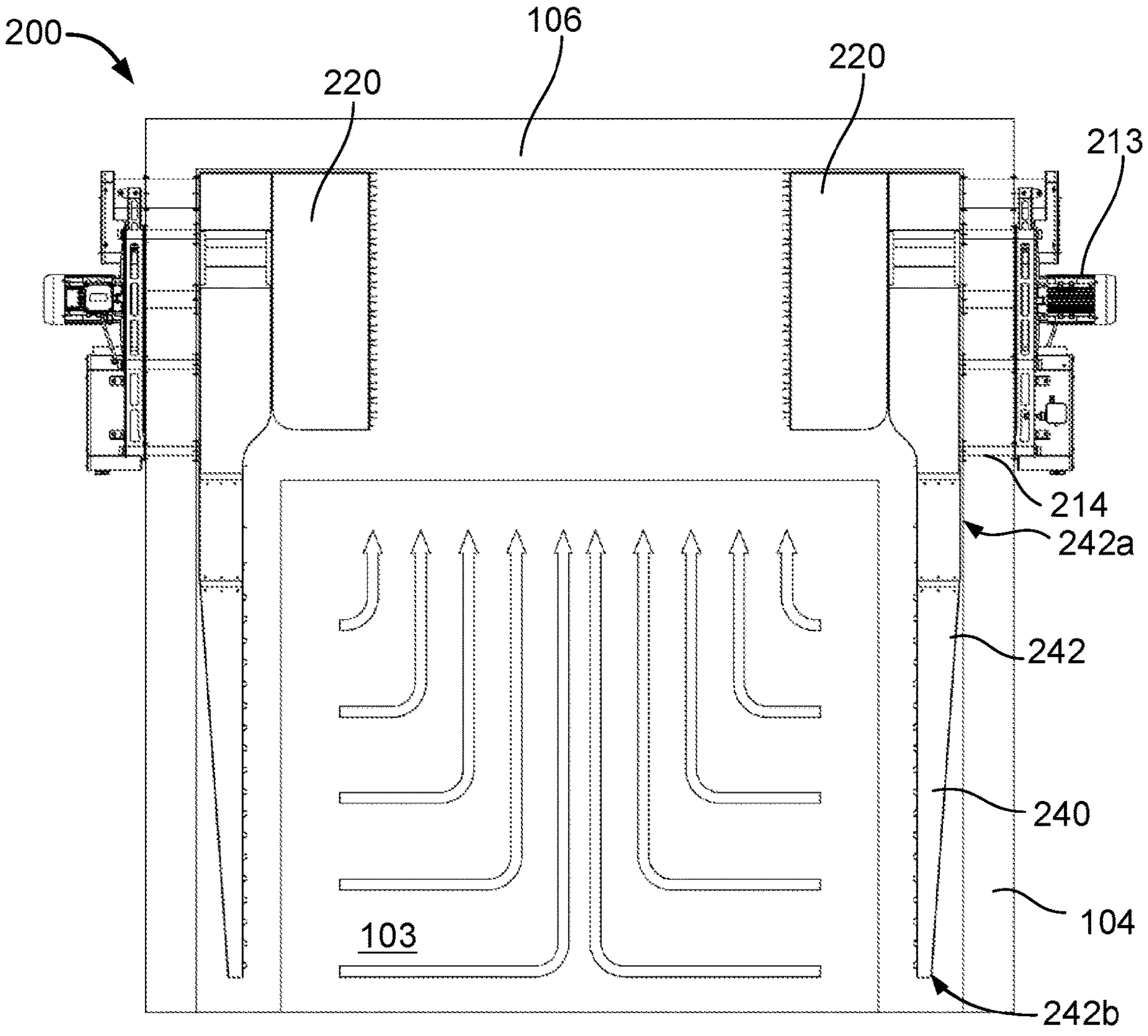
FIG. 11 illustrates a side elevation view of the example modular industrial energy transfer system of FIG. 10 illustrating an example airflow pattern in accordance with various embodiments.

The system 100 described herein may be constructed using any number of suitable alternative approaches. For example, FIGS. 10 and 11 illustrate a second example energy transfer unit 210 for use in the system 100. It is appreciated that the energy transfer unit 210 illustrated in FIGS. 10 and 11 may include similar features to the energy transfer unit 110 illustrated in FIGS. 1-9, and accordingly, elements illustrated in FIGS. 10 and 11 are designated by similar reference numbers indicated in the embodiment illustrated in FIGS. 1-9 increased by 100. Accordingly, these features will not be described in substantial detail. Further, it is appreciated that any of the elements described with regards to the energy transfer unit 110 may be incorporated into the energy transfer unit 210, and vice-versa.

In this example, the energy transfer unit 210 is coupled with the sidewall 104 instead of being mounted through the ceiling member 106. Such a configuration may reduce the overall height of the system 100. More specifically, the energy transfer unit 210 does not include an elbow between the housing body 222 and the hollow duct body 242. Rather, the energy transfer unit 210 forms a generally straight or linear module.

In this example, the duct member 240 has a generally tapered profile. More specifically, the hollow duct body 242 decreases in width towards the distal end 242*b* thereof. Such an arrangement may assist in evenly distributing air for improved airflow.

Unless specified otherwise, any of the feature or characteristics of any one of the embodiments of the spreader sprayer machine disclosed herein may be combined with the features or characteristics of any other embodiments of the spreader sprayer machine.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A method of assembling a modular industrial energy transfer system, the method comprising:

providing a shell including a plurality of sidewalls, a ceiling member coupled to the plurality of sidewalls, and a plurality of mounting structures disposed along the shell;

identifying, based on at least one desired characteristic of the modular industrial energy transfer system, at least one energy transfer unit from a group of selectable energy transfer units;

selecting the at least one identified energy transfer unit;

assembling the modular industrial energy transfer system by mounting the at least one selected energy transfer unit to the shell via at least one of the plurality of mounting structures;

wherein the identified at least one energy transfer unit comprises:

a base member including a motor and at least one mounting leg coupled to the motor;

a housing member including a housing body having a drive opening, a housing inlet, and at least one coupling mechanism, the at least one mounting leg being operably coupled to the at least one coupling mechanism;

a fan at least partially disposed within the housing member and being operably coupled to the motor via a motor drive shaft; and a duct member operably coupled to the housing member, the housing member including a duct body having a duct inlet and at least one duct outlet;

wherein actuation of the motor causes the fan to rotate, thereby causing air in the interior volume of the shell to enter the housing inlet and circulate through the at least one duct outlet.

2. The method of claim 1, wherein the at least one desired characteristic comprises at least one of a desired energy transfer capacity, and a desired energy transfer source.

3. The method of claim 1, wherein the group of selectable energy transfer units comprises an air recirculator, an air recirculator having a fluid heating element, or an air recirculator having an electric heating element.

4. The method of claim 1, further comprising mounting at least one additional energy transfer unit to the shell via at least one of the plurality of mounting structures.

5. The method of claim 4, wherein the at least one additional energy transfer unit includes different components than the at least one selected energy transfer unit.

6. A method of assembling a modular industrial energy transfer system, the method comprising:

providing a shell including a plurality of modular sidewalls, a ceiling member coupled to the plurality of modular sidewalls, and a plurality of mounting structures disposed along the shell;

coupling at least one energy transfer unit to the shell via at least one of the plurality of mounting structures such that the at least one energy transfer unit is partially disposed through the shell to generate an airflow pattern through an interior volume of the shell;

wherein the at least one energy transfer unit comprises:

a base member including a motor and at least one mounting leg coupled to the motor;

a housing member including a housing body having a drive opening, a housing inlet, and at least one coupling mechanism, the at least one mounting leg being operably coupled to the at least one coupling mechanism;

a fan at least partially disposed within the housing member and being operably coupled to the motor via a motor drive shaft; and a duct member operably coupled to the housing member, the housing member including a duct body having a duct inlet and at least one duct outlet.

7. The method of claim 6, further comprising coupling at least one additional energy transfer unit to the shell via at least one of the plurality of mounting structures.

8. The method of claim 6, further comprising coupling a controller to the at least one energy transfer system to control operation thereof.

* * * * *